(12) United States Patent
Nakamura

(10) Patent No.: US 7,180,625 B2
(45) Date of Patent: Feb. 20, 2007

(54) PRINTER CONTROLLER, IMAGE FORMING APPARATUS AND STORAGE MEDIUM

(75) Inventor: Satoru Nakamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 798 days.

(21) Appl. No.: 09/923,960

(22) Filed: Aug. 8, 2001

(65) Prior Publication Data
US 2002/0054302 A1 May 9, 2002

(30) Foreign Application Priority Data
Aug. 9, 2000 (JP) .............................. 2000-240892
Jul. 30, 2001 (JP) .............................. 2001-229311

(51) Int. Cl.
*G06F 15/00* (2006.01)
(52) U.S. Cl. ...................... 358/1.2; 358/504; 382/175; 382/194; 382/199; 399/72
(58) Field of Classification Search .................. 358/1.2, 358/504; 382/175, 194
See application file for complete search history.

(56) References Cited

U.S. PATENT DOCUMENTS

| | | | | |
|---|---|---|---|---|
| 4,698,691 A | * | 10/1987 | Suzuki et al. ............... | 358/3.2 |
| 5,258,783 A | * | 11/1993 | Sasanuma et al. ............ | 347/115 |
| 5,579,090 A | * | 11/1996 | Sasanuma et al. ............ | 399/49 |
| 5,583,644 A | * | 12/1996 | Sasanuma et al. ............ | 358/296 |
| 5,737,665 A | * | 4/1998 | Sugiyama et al. ............ | 399/39 |
| 5,797,061 A | * | 8/1998 | Overall et al. ............... | 399/27 |
| 5,835,235 A | * | 11/1998 | Goto et al. .................. | 358/406 |
| 5,946,452 A | * | 8/1999 | Spaulding et al. ........... | 358/1.9 |
| 6,034,788 A | * | 3/2000 | Sasanuma et al. ........... | 358/406 |
| 6,061,144 A | * | 5/2000 | Mamizuka ................... | 358/1.9 |
| 6,076,915 A | * | 6/2000 | Gast et al. ..................... | 347/19 |
| 6,215,562 B1 | * | 4/2001 | Michel et al. ................ | 358/1.9 |
| 6,289,125 B1 | * | 9/2001 | Katoh et al. ................. | 382/194 |
| 6,367,992 B1 | * | 4/2002 | Aruga et al. .................. | 400/76 |

(Continued)

FOREIGN PATENT DOCUMENTS

JP  11-70701  3/1999

(Continued)

OTHER PUBLICATIONS

Computer Translation of Japanese Patent Document No. 11-070701 to Watabe, dated Mar. 16, 1999.*

*Primary Examiner*—Twyler Lamb
*Assistant Examiner*—Mark R. Milia
(74) *Attorney, Agent, or Firm*—Oblon, Spivak, McClelland, Maier & Neustadt, P.C.

(57) ABSTRACT

A printer controller generates pattern data to be printed by a printer engine for use in carrying out a tone adjusting process. The printer controller includes a memory which stores reference tone patterns and tone adjusting patterns, a selecting section for selecting a dot size of one of the reference tone patterns to be printed, the dot size being determined by a number of pixels forming each dot, and a generating section for generating and outputting to the printer engine the one of the reference tone patterns by the dot size selected by the selecting section and tone adjusting patterns having tones falling within a predetermined range with respect to a reference tone of the one of the reference tone patterns, based on the reference tone patterns and the tone adjusting patterns stored in the memory.

33 Claims, 11 Drawing Sheets

U.S. PATENT DOCUMENTS 6,417,876 B1 * 7/2002 Nakajima et al. ............ 347/131
6,535,307 B1 * 3/2003 Allen et al. .................. 358/504
6,618,162 B1 * 9/2003 Wiklof et al. ............... 358/1.15
6,643,032 B1 * 11/2003 Crean et al. ................ 358/3.06
6,912,064 B1 * 6/2005 Fujita .......................... 358/1.9

FOREIGN PATENT DOCUMENTS

JP          2000-190572          7/2000

* cited by examiner

| COUNTED VALUE OF MAINTENANCE COUNTER | DOT SIZE (PIXELS) |
|---|---|
| 100 | 4 x 4 |
| 1000 | 8 x 8 |
| 2000 | 10 x 10 |

| REMAINING AMOUNT OF TONER | DOT SIZE (PIXELS) |
|---|---|
| 100 | 4 x 4 |
| 90 | 3 x 3 |
| 80 | 4 x 4 |
| 10 | 8 x 8 |

| ENGINE ID | POINTER TO PATTERN TABLE |
|---|---|
| 0120304 | POINTER TO PATTERN TABLE FOR TYPE A |
| 0220304 | POINTER TO PATTERN TABLE FOR TYPE B |
| 0220300 | POINTER TO PATTERN TABLE FOR TYPE C |
| 0120300 | POINTER TO PATTERN TABLE FOR TYPE D |

| RESOLUTION (dpi) | DOT SIZE (PIXELS) |
|---|---|
| 300 x 300 | 2 x 2 |
| 400 x 400 | 3 x 3 |
| 600 x 600 | 4 x 4 |
| 1200 x 1200 | 8 x 8 |

PRINTER CONTROLLER, IMAGE FORMING APPARATUS AND STORAGE MEDIUM

BACKGROUND OF THE INVENTION

This application claims the benefit of a Japanese Patent Application No. 2000-240892 filed Aug. 9, 2000, in the Japanese Patent Office, the disclosure of which is hereby incorporated by reference.

This application further includes contents of a Japanese Patent Application No. 11-314395 filed Nov. 4, 1999, in the Japanese Patent Office, and laid open under Japanese Laid-Open Patent Application No. 13-130056 on May 15, 2001, the disclosure of which is hereby incorporated by reference.

FIELD OF THE INVENTION

The present invention generally relates to printer controllers, image forming apparatuses and storage media, and more particularly to a printer controller which has a tone adjusting function for adjusting a tone of an output image which is to be printed, to an image forming apparatus which prints on a recording medium tone adjusting patterns which are used for adjusting the tone of the output image which is to be printed by carrying out a so-called γ-correction, and to a computer-readable storage medium which stores a program for causing a computer to print such tone adjusting patterns and/or to carry out such a tone adjusting function.

DESCRIPTION OF THE RELATED ART

A description will be given of an example of a conventional image forming apparatus, by referring to FIG. 1. FIG. 1 is a system block diagram showing a general structure of a conventional printer.

The printer shown in FIG. 1 includes a printer controller 2 and a printer engine 8, and the printer is coupled to a host computer 1 via the printer controller 2. The printer controller 2 includes a host interface (I/F) 3, a CPU 4, a RAM 5, a program ROM 6, and an engine interface (I/F) 7 which are coupled via a system bus 9.

A user creates a data which is to be printed, by use of the host computer 1. In addition, the user specifies a printer which is to print the created data, and issues a print instruction with respect to the specified printer. In the printer which receives the print instruction, the host interface 3 within the printer controller 2 starts to receive the data which is to be printed. Then, based on the received data, the CPU 4 within the printer controller 2 generates an image data which is to be printed, based on a program stored in the program ROM 6. The generated image data is drawn and developed in a frame memory which is formed by the RAM 5, depending on a tone specified by the print instruction. Thereafter, the image data developed in the frame memory is supplied to the printer engine 8 via the engine interface 7, and the printer engine 8 prints the image data on a recording medium such as paper.

The tone of the image data which is actually printed on the recording sheet by the printer engine 8 of the printer may be different from the tone originally intended by the printer controller 2 due to surrounding environment and/or change caused by aging. In other words, the tone of the image which is created by the host computer 1 may be different from the tone of the image actually generated by the printer controller 2.

The printer may be provided with a reading unit such as a scanner (not shown), in addition to the printer controller 2 having the tone adjusting function. In this case, the printer engine 2 prints an image on the recording medium based on the image data which is generated to obtain the intended tone. Then, the printed image on the recording medium is read by the scanner, and the printer controller 2 compares the read tone and the intended tone. If an error exists between the two compared tones, the γ-correction is carried out to correct the tone and to eliminate the error. In other words, the γ-correction is carried out in order to print the image on the recording medium with the tone intended by the printer controller 2, that is, with the tone intended by the host computer 1.

The γ-correction itself is known. An input-output characteristic of the printer engine 2 is not linear, and the input-output characteristic of the printer engine 2 may change due to aging of the printer engine 2 and/or the environment in which the printer is used. In addition, each individual printer engine 2 has a different input-output characteristic, even among the same model or type of printer engines 2. Hence, the γ-correction is carried out to compensate for the non-linear and changing input-output characteristic of the printer engine 2.

But not all printers are provided with the scanner, and the γ-correction is carried out as follows when no scanner is provided. First, a sample sheet which is printed with test patterns of various tones is prepared. Second, the printer engine 2 prints an image on the recording medium with the intended tone. Third, the user compares the intended tone printed on the sample sheet with the intended tone actually printed on the recording medium, and inputs an error between the two compared tones to the printer engine 2. The printer engine 2 carries out the γ-correction based on the input error.

But in this case, the sample sheet and the recording medium must have identical colors and textures (or quality) in order to obtain an accurate comparison result of the tones, thereby putting a burden on the user to keep the sample sheet and the recording media having the color and texture identical to those of the sample sheet. The γ-correction cannot be carried out if the sample sheet is lost. In addition, in order to obtain an accurate comparison result, the recording medium must be printed with the tones under the same environment as that for the sample sheet. Moreover, when the sample sheet deteriorates due to aging, it is impossible to obtain an accurate comparison result of the tones. Furthermore, there is also a burden on the user in that the user must print the intended tones on the recording medium after carry out the γ-correction, so as to check whether or not the input-output characteristic of the printer engine 2 is appropriately corrected, and in that such an operation must be repeated until the tones on the sample sheet and the recording medium match.

It is possible to reduce the number of tones which are printed on the recording medium for comparison with the sample sheet, so as to reduce the number of times the above described operation must be repeated and accordingly reduce the burden on the user. However, the smaller the number of tones printed on the recording medium for comparison with the sample sheet, the poorer the quality of the γ-correction which is carried out.

SUMMARY OF THE INVENTION

Accordingly, it is a general object of the present invention to provide a novel and useful printer controller, image forming apparatus and computer-readable storage medium, in which the problems described above are eliminated.

Another and more specific object of the present invention is to provide a printer controller, an image forming apparatus and a computer-readable storage medium which enable an accurate γ-correction to be carried out, without the need for a sample sheet, and regardless of the color, texture (quality) and the like of a recording medium on which tone adjusting patterns are printed for use in adjusting the tone of an image which is to be printed.

Still another object of the present invention is to provide a printer controller which generates pattern data to be printed by a printer engine for use in carrying out a tone adjusting process, comprising a memory which stores reference tone patterns and tone adjusting patterns; selecting means for selecting a dot size of one of the reference tone patterns to be printed, the dot size being determined by a number of pixels forming each dot; and generating means for generating and outputting to the printer engine the one of the reference tone patterns by the dot size selected by the selecting means and tone adjusting patterns having tones falling within a predetermined range with respect to a reference tone of the one of the reference tone patterns, based on the reference tone patterns and the tone adjusting patterns stored in the memory. According to the printer controller of the present invention, it is possible to enable an accurate γ-correction to be carried out, without the need for a sample sheet, and regardless of the color, texture (quality) and the like of the recording medium on which the reference tone pattern and the tone adjusting patterns are printed for use in adjusting the tone of an image which is to be printed.

A further object of the present invention is to provide an image forming apparatus comprising a printer controller which generates pattern data; and a printer engine which prints the pattern data generated by the printer controller for use in carrying out a tone adjusting process, where the printer controller comprises a memory which stores reference tone patterns and tone adjusting patterns; selecting means for selecting a dot size of one of the reference tone patterns to be printed, the dot size being determined by a number of pixels forming each dot; and generating means for generating and outputting to the printer engine the one of the reference tone patterns by the dot size selected by the selecting means and tone adjusting patterns having tones falling within a predetermined range with respect to a reference tone of the one of the reference tone patterns, based on the reference tone patterns and the tone adjusting patterns stored in the memory. According to the image forming apparatus of the present invention, it is possible to enable an accurate γ-correction to be carried out, without the need for a sample sheet, and regardless of the color, texture (quality) and the like of the recording medium on which the reference tone pattern and the tone adjusting patterns are printed for use in adjusting the tone of an image which is to be printed.

Another object of the present invention is to provide a computer-readable storage medium which stores a program for causing a computer which generates pattern data to be printed by a printer engine for use in carrying out a tone adjusting process, where the program comprises storing means for causing the computer to store reference tone patterns and tone adjusting patterns; selecting means for causing the computer to select a dot size of one of the reference tone patterns to be printed, the dot size being determined by a number of pixels forming each dot; and generating means for causing the computer OT generate and output to the printer engine the one of the reference tone patterns by the dot size selected by the selecting means and tone adjusting patterns having tones falling within a predetermined range with respect to a reference tone of the one of the reference tone patterns, based on the reference tone patterns and the tone adjusting patterns stored by the storing means. According to the computer-readable storage medium of the present invention, it is possible to enable an accurate γ-correction to be carried out, without the need for a sample sheet, and regardless of the color, texture (quality) and the like of the recording medium on which the reference tone pattern and the tone adjusting patterns are printed for use in adjusting the tone of an image which is to be printed.

Other objects and further features of the present invention will be apparent from the following detailed description when read in conjunction with the accompanying drawings.

DESCRIPTION OF THE PREFERRED EMBODIMENTS

Figure 1:
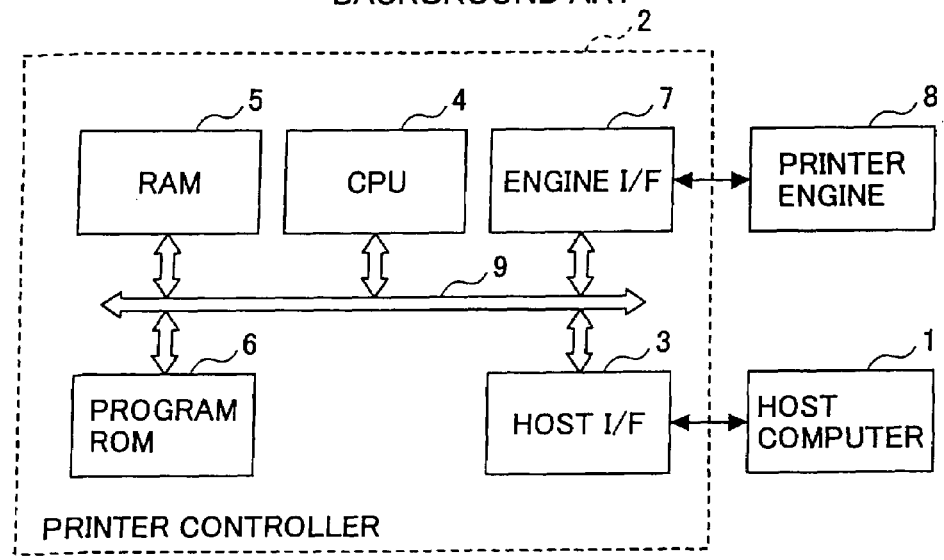
FIG. 1 is a system block diagram showing a general structure of a conventional printer.
Figure 2:
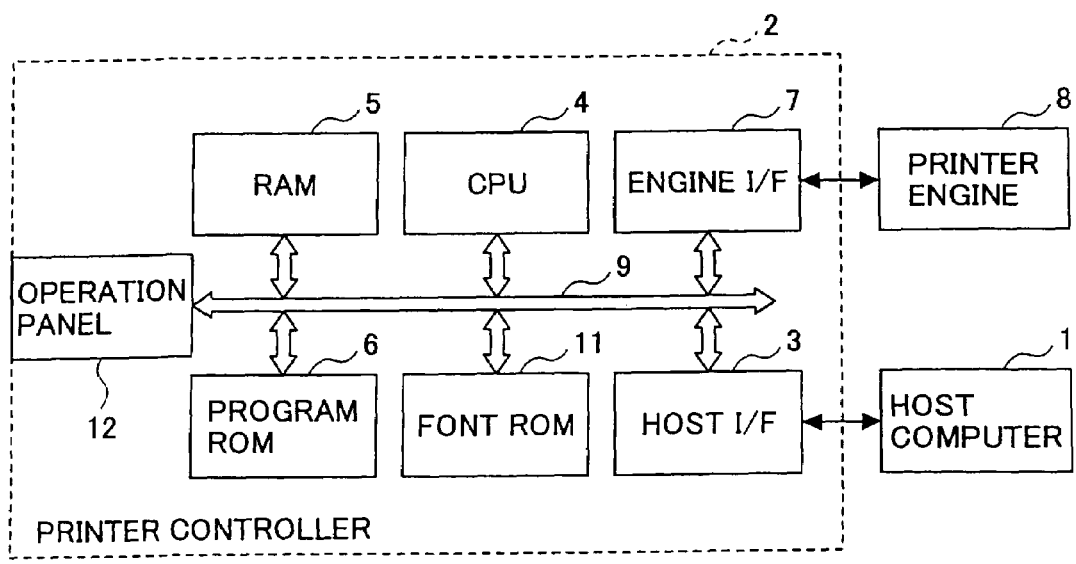
FIG. 2 is a system block diagram showing a first embodiment of an image forming apparatus according to the present invention.
Figure 3:
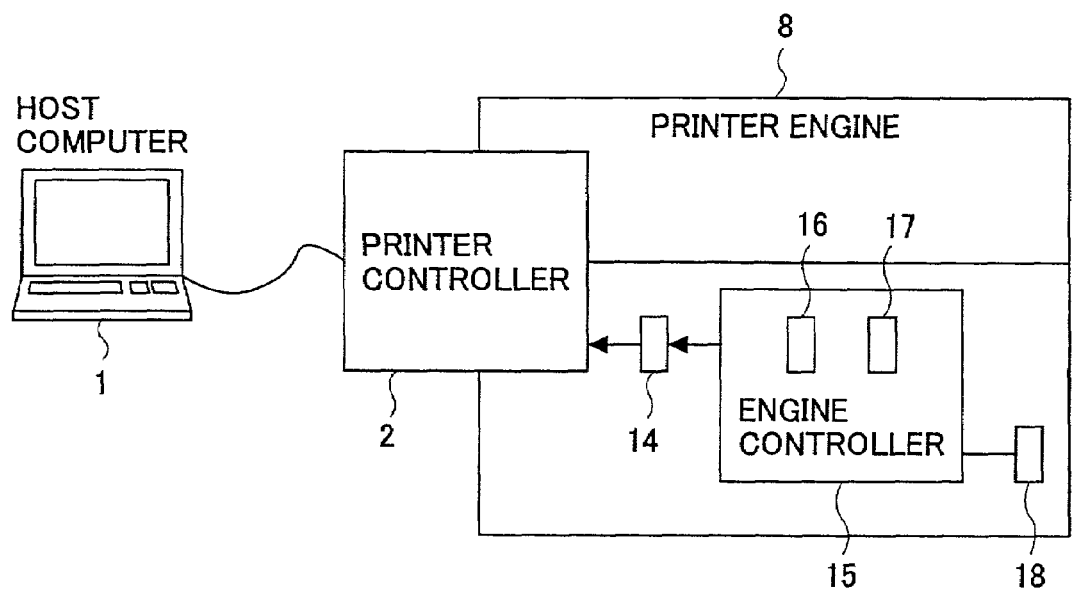
FIG. 3 is a diagram showing an important part of the first embodiment of the image forming apparatus.

FIG. 2 is a system block diagram showing a first embodiment of an image forming apparatus according to the present invention, and FIG. 3 is a diagram showing an important part of this first embodiment of the image forming apparatus. In this first embodiment of the image forming apparatus, the present invention is applied to a printer. Further, this first embodiment of the image forming apparatus employs a first embodiment of a printer controller according to the present invention and a first embodiment of a computer-readable storage medium according to the present invention. In FIGS. 2 and 3, those parts which are the same as those corresponding parts in FIG. 1 are designated by the same reference numerals, and a description thereof will be omitted.

As shown in FIG. 2, the printer controller 2 additionally includes a font ROM 11 and an operation panel 12 which are coupled to the system bus 9. The font ROM 11 prestores various fonts which may be used for the printing by the printer engine 8. The operation panel 12 has a known structure including a display section for displaying messages and a key section for inputting instructions. The display section and the key section may be made of independent parts or integrally formed by a single part such as a touch-panel having the functions of both the display section and the key section. In addition, as shown in FIG. 3, the printer engine includes an engine interface (I/F) 14, an engine controller 15, and a toner sensor 18. The engine controller 15 includes a maintenance counter 16 and an engine ID register 17. The engine controller 15 controls the general operation of the printer engine 8. The maintenance counter 16 counts the number of prints made or the like by a known method, and the printer controller 2 recognizes a timing at which the maintenance of the printer is required when a counted value of the maintenance counter 16 reaches a predetermined value. The counted value of the maintenance counter 16 accordingly indicates the total operating time of the printer engine 8. The engine ID register 17 stores an engine ID which indicates the model or type of the printer engine 8, so that the printer controller 2 can recognize the model or type of the printer engine 8 that is used by reading the engine ID register 17. The toner sensor 18 senses a remaining amount of toner in the printer by a known method, so that the printer controller 2 can recognize a low toner state where the toner needs to be supplied based on an output of the toner sensor 18.

Figure 4:
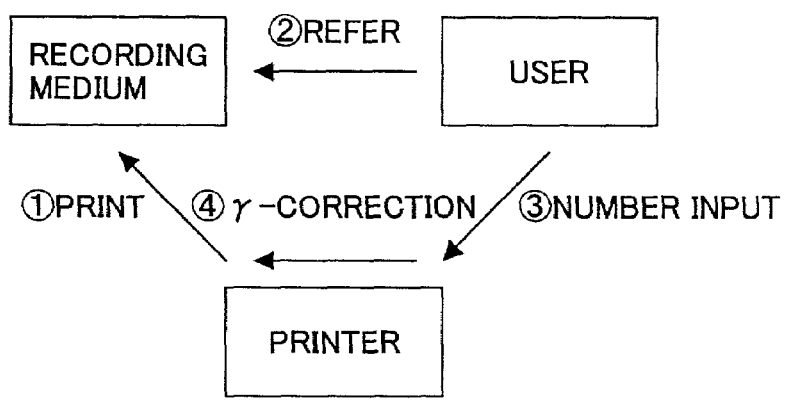
FIG. 4 is a diagram for explaining a basic procedure for carrying out a tone adjusting process.

FIG. 4 is a diagram for explaining a basic procedure for carrying out a tone adjusting process. First, a step ① prints tone adjusting patterns and a reference tone pattern on a recording medium such as paper under a predetermined printing condition. The tone adjusting patterns and the reference tone pattern printed on the recording medium will be described later in more detail with reference to FIG. 5. The tone adjusting patterns are printed at tones which are different but fall within a predetermined tone range which includes the reference tone. The user compares the printed tone adjusting patterns and the reference tone pattern on the recording medium in a step ②, so as to specify one of the tone adjusting patterns having the same tone as the reference tone pattern. Hence, a tone value which has the tone matching the reference tone of the reference tone pattern is obtained as a relative value of the reference tone printed under the actual printing condition. The user inputs the obtained tone value as a tone adjusting value to the printer in a step ③, by inputting a number or code which is assigned to the specified tone adjusting pattern. A step ④ carries out a known γ-correction based on the input tone value which is printed under the actual printing condition and an anticipated tone value which is originally intended by the printer controller 2.

Figure 5:
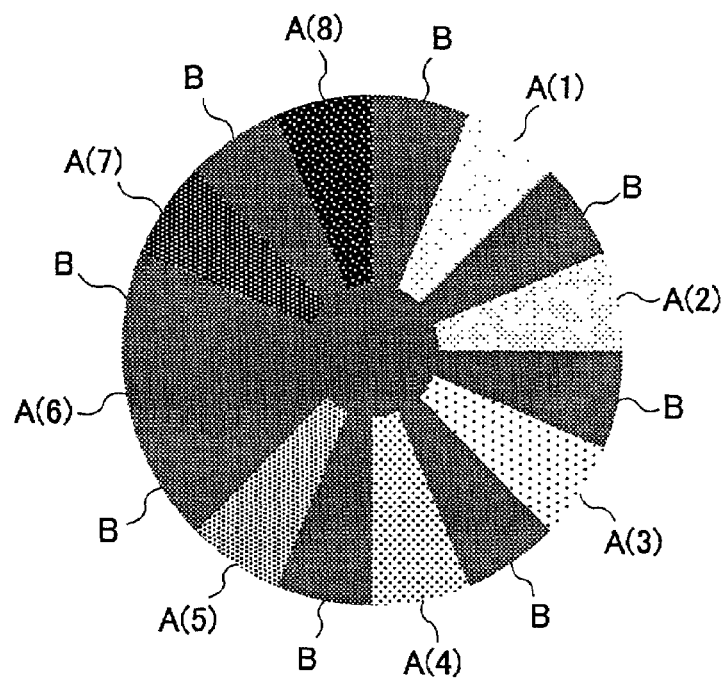
FIG. 5 is a diagram showing tone adjusting patterns and a reference tone pattern printed on a recording medium.

FIG. 5 is a diagram showing the tone adjusting patterns and the reference tone pattern printed on the recording medium. As shown in FIG. 5, a reference tone pattern B is formed by a central portion and sector portions arranged intermittently in a 360 degree range. On the other hand, tone adjusting patterns A(1) through A(8) are formed by sector portions respectively arranged intermittently to be located between two mutually adjacent sector portions of the reference tone pattern B. In other words, each of the tone adjusting patterns A(1) through A(8) has three sides which are respectively adjacent to the reference tone pattern B. The tone adjusting patterns A(1) through A(8) have mutually different tones which fall within a predetermined tone range which includes the reference tone of the reference tone pattern B. The numbers (1) through (8) assigned to the tone adjusting patterns A(1) through A(8) indicate a tone value which is higher for a larger number, and the tone value successively increases at a constant rate with increasing tone value. Of course, the number of tone values is not limited to eight as shown in FIG. 5. Further, the shape of the central portion of the reference tone pattern B and the entire shape formed by the reference tone pattern B and the tone adjusting patterns A(1) through A(8) are not limited to the circular shapes shown in FIG. 5, and the shapes may be oval, for example.

Because each of the tone adjusting patterns A(1) through A(8) is located between two mutually adjacent reference tone pattern B and is also adjacent to the central portion of the reference tone pattern B, the user can easily find one of the tone adjusting patterns A(1) through A(8) having the tone which matches the tone of the reference tone pattern B. In this particular case shown in FIG. 5, the user can easily see that the tone adjusting pattern A(6) has the tone which matches the tone of the reference tone pattern B. Hence, the user inputs to the printer the number (6) which is assigned to the tone adjusting pattern A(6), so as to reflect the tone value of the tone adjusting pattern A(6) to the γ-correction.

Figure 6:
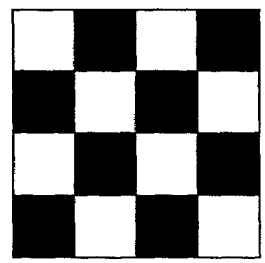
FIG. 6 is a diagram showing a reference tone pattern printed on the recording medium using dots formed by 1×1 pixel.
Figure 7:
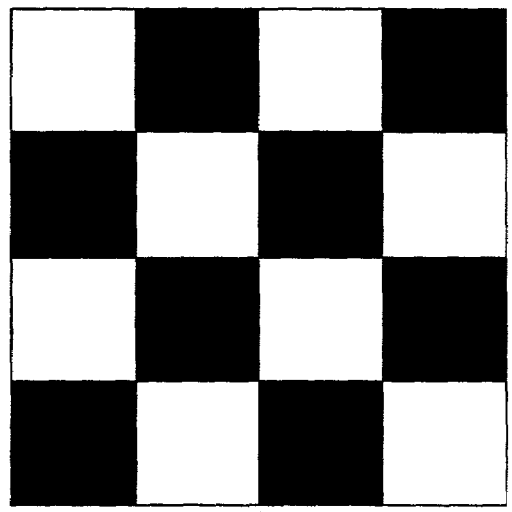
FIG. 7 is a diagram showing a reference tone pattern printed on the recording medium using dots formed by 2×2 pixels.

The reference tone pattern B which is printed on the recording medium needs to be set to a pattern which is unaffected by various factors such as the conditions of the printer at the time of the printing, the changes caused by aging of the printer, the differences in the performance of each individual printer inevitably introduced during the production process and/or by the components used, the set output condition of the printer engine 8, and the like. For example, when creating a maximum tone of 50% of the printer engine 8, it is possible to employ a checker-board pattern shown in FIG. 6 or FIG. 7. FIG. 6 is a diagram showing the reference tone pattern B printed on the recording medium using dots formed by 1×1 pixel, that is, a single pixel. On the other hand, FIG. 7 is a diagram showing the reference tone pattern B printed on the recording medium using dots formed by 2×2 pixels.

In the reference tone pattern B shown in FIG. 6, each dot forming the reference tone pattern B is formed by one pixel which is the minimum unit that can be created by the printer engine 8. But in this case, the reference tone pattern B is affected by the output characteristic of the printer engine 8, and it is difficult to create a stable tone of 50%. For this reason, when each dot is formed by several pixels such as 2×2 pixels as in the case shown in FIG. 7, it is possible to create a stable tone of 50% which is unaffected by the output characteristic of the printer engine 8.

But when the number of pixels forming each dot is set as described above so as to be unaffected by the output characteristic of the printer engine 8, the number of pixels forming each dot is fixed. As a result, it is still insufficient to avoid the reference tone pattern B from being affected by the various other factors such as the conditions of the printer at the time of the printing, the changes caused by aging of the printer, and the differences in the performance of each individual printer inevitably introduced during the production process and/or by the components used.

For example, the operating conditions of the printer controller 2 which are set include a drawing mode which specifies the resolution or specifies the printing of characters or photographs. The tone which is output from the printer engine 8 may differ depending on the set drawing mode. In other words, when a reference pattern having a predetermined tone is printed at a resolution of 600 dpi and the reference pattern having the predetermined tone is printed at a resolution of 1200 dpi, one of the printed output result may be darker or lighter than the other. In addition, the printer controller 2 may be designed to operate with a plurality of kinds of printer engines 8, and in such a case, the printed output result of course differs depending on the kind of printer engine 8 that is used. Furthermore, even when the same printer engine 8 is used, the printed output result may differ depending on the remaining amount of toner, the total operating time of the various parts and components related to the image formation by the electrophotography process of the printer. Moreover, in the case of a color printer, the basic colors used to print a color image, such as cyan, magenta, yellow and black, have mutually different tone characteristics, and the reference tone cannot be maintained constant to the intended tone value for each of the basic colors using the same reference tone pattern B.

Accordingly, various reference tone patterns B having the checker-board pattern in which each dot is formed by N×M pixels, is created in advance during the designing stage, and stored in the program ROM 6 within the printer controller 2, where N and M are positive integers. As will be described later, a most appropriate one of the stored reference tone patterns B in the program ROM 6 is selected by a reference tone pattern selecting means, and printed on the recording medium together with the tone adjusting patterns A(1) through A(8) as shown in FIG. 5.

Next, a description will be given of the reference tone pattern selecting means for selecting the reference tone pattern B depending on the various factors such as the conditions of the printer at the time of the printing, the changes caused by aging of the printer, the differences in the performance of each individual printer inevitably introduced during the production process and/or by the components used, the set output condition of the printer engine 8, and the like, which affect the reference tone indicated by the reference tone pattern B, so as to change the size of each dot forming the reference tone pattern B. More particularly, the values of N and M of the N×M pixels forming each dot of the reference tone pattern B are selected.

Figure 8:
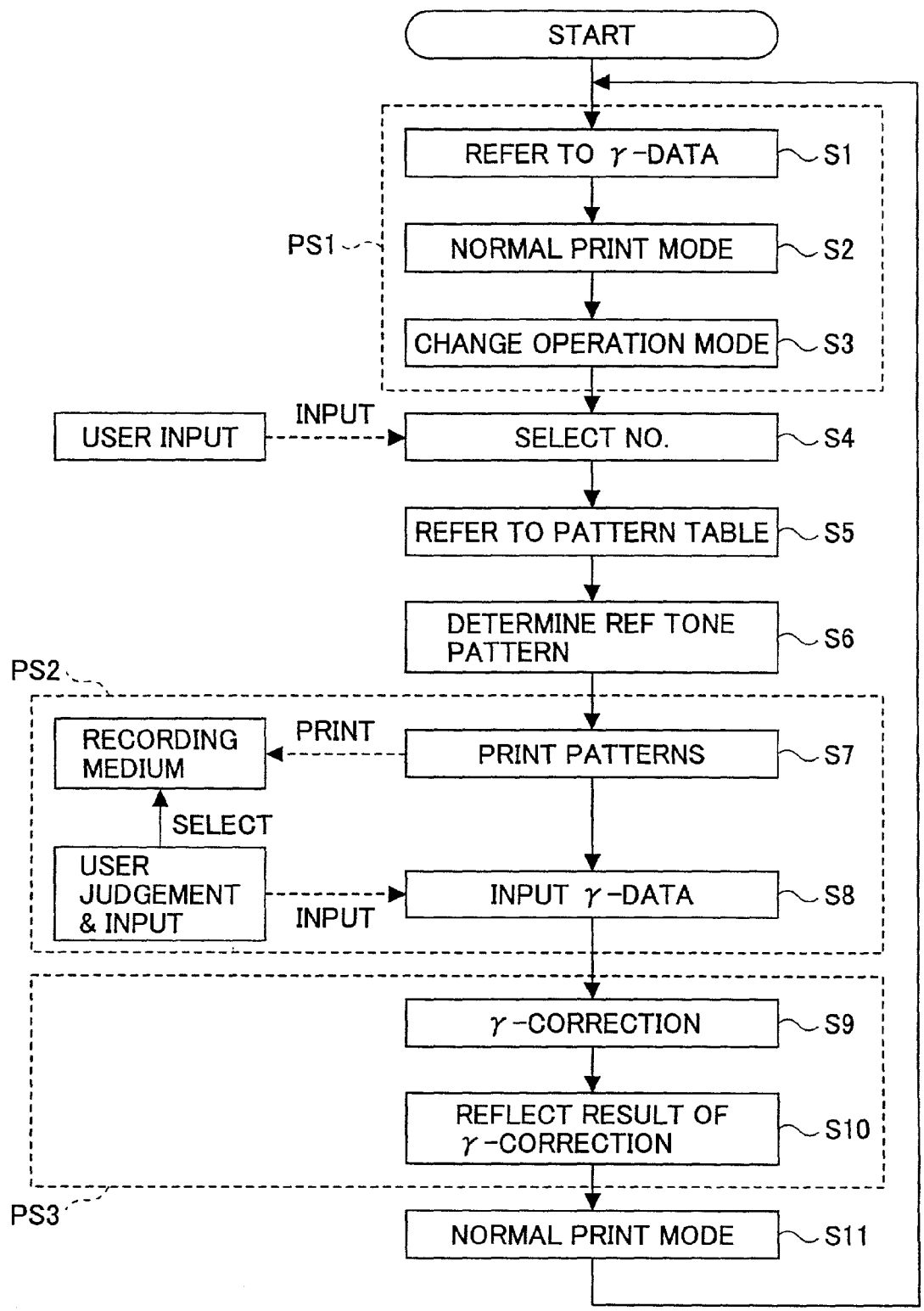
FIG. 8 is a flow chart for explaining the operation of the first embodiment of the image forming apparatus.

FIG. 8 is a flow chart for explaining the operation of this first embodiment of the image forming apparatus. The process shown in FIG. 8 is carried out by the CPU 4 within the printer controller 2 shown in FIG. 2. The first embodiment of the computer-readable storage medium stores a program for causing a computer, such as the CPU 4, to carry out the process shown in FIG. 8. The first embodiment of the computer-readable storage medium is formed by the program ROM 6 shown in FIG. 2 or, any type of recording media capable of storing the program, such as semiconductor memories, disks including magnetic, optical and magneto-optical disks and memory cards.

In FIG. 8, a step S1 refers to γ-data which are used for the γ-correction and are stored in the program ROM 6, for example. A step S2 sets the operation mode of the printer to a normal print mode. A step S3 changes the operation mode of the printer to a tone adjusting mode if the tone adjusting mode is instructed by the user from the operation panel 12. The steps S1 through S3 form a process section PS1.

A step S4 selects a number or code assigned to the selected size of the dots which are to form the reference tone pattern B, in response to the input made by the user from the operation panel 12. The user can select the number of code assigned to the selected size of the dots which are to form the reference tone pattern B, depending on the condition under which the printer is to carry out the printing. A step S5 refers to a pattern table stored in the program ROM 6. The pattern table stores the reference tone patterns B in correspondence with the numbers or codes assigned to the selected dot sizes. Hence, the corresponding reference tone pattern B can be read from the pattern table based on the input number or code assigned to the selected dot size. A step S6 determines the reference tone pattern B based on the pattern table.

A step S7 prints on the recording medium the selected reference tone pattern B together with the tone adjusting patterns A(1) through A(8) which are also stored in the program ROM 6, so as to obtain a printed output result similar to that shown in FIG. 5. The tone adjusting patterns A(1) through A(8) have mutually different tones which fall within the predetermined tone range which includes the reference tone of the selected reference tone pattern B. The user inputs from the operation panel 12 the number (6), for example, which is assigned to the tone adjusting pattern A(6), so as to reflect the tone value of the tone adjusting pattern A(6) to the γ-correction. Hence, a step S8 inputs the γ-data corresponding to the selected tone adjusting pattern A(6). The steps S7 and S8 form a process section PS2.

A step S9 carries out the γ-correction based on the input γ-data, and a step S10 reflects the result of the γ-correction to the tone which is to be printed. The steps S9 and S10 form a process section PS3.

A step S11 restores the operation mode of the printer to the normal printing mode, and the process returns to the step S1.

Therefore, according to this first embodiment, it is possible to generate the reference tone pattern B which is made up of dots respectively made up of a number of pixels selected depending on the conditions under which the printer is to carry out the printing. For this reason, the reference tone which is printed on the recording medium can be maintained constant regardless of the various factors such as the conditions of the printer at the time of the printing, the changes caused by aging of the printer, the differences in the performance of each individual printer inevitably introduced during the production process and/or by the components used, the set output condition of the printer engine 8, and the like. Hence, it is possible to carry out an appropriate tone adjusting process by use of the recording medium which is printed with the selected reference tone pattern B and the tone adjusting patterns A(1) through A(8), so that the tone intended by the user is actually printed by the printer.

Next, a description will be given of the selection of the reference tone pattern B depending on the deterioration of the printer engine 8, which is one of the factors affecting the reference tone.

As the deterioration of the printer engine 8 progresses with aging, the reproducibility of small dots becomes poor, and it becomes impossible to correctly represent the reference tone unless the reference tone pattern B is formed by relatively large dots. Hence, in this embodiment, the size of each dot forming the reference tone pattern B is determined depending on the degree of deterioration of the printer engine 8, so that the reference tone is maintained to the correct tone value. But if the size of each dot forming the reference tone pattern B is made too large, the reference tone pattern B cannot be recognized as one tone by the human eyes and may appear as a design or, the user must monitor the reference tone pattern B from a certain distance so that the reference tone pattern B may be recognized as one tone and not a design. Accordingly, the size of each dot forming the reference tone pattern B must be determined so that one tone is recognizable therefrom by the human eyes.

One amount which may be referred to in order to judge the degree of deterioration of the printer engine 8, is the counted value of the maintenance counter 16 which may be referred to by the CPU 4 of the printer controller 2 at an arbitrary timing. For example, the maintenance counter 16 counts the number of prints made by the printer engine 8, so as to determine the timings for attending to the maintenance or replacing the parts of the printer engine 8 such as a photoconductive drum and a transfer drum. The degree of deterioration of the printer engine 8 can be predicted from the counted value of the maintenance counter 16, and a second embodiment of the image forming apparatus according to the present invention employs such a prediction. In this second embodiment of the image forming apparatus, the present invention is applied to a printer having the structure shown in FIGS. 2 and 3. Further, this second embodiment of the image forming apparatus employs a second embodiment of the printer controller according to the present invention and a second embodiment of the computer-readable storage medium according to the present invention.

Figures 9, 10:
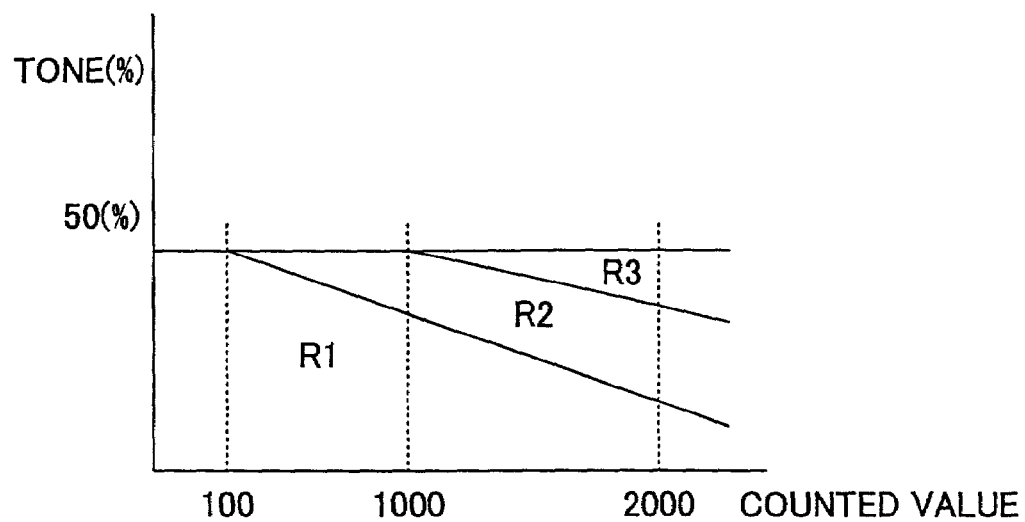
FIG. 9 is a diagram showing a relationship of the tone and a counted value of a maintenance counter.
FIG. 10 is a diagram showing contents of a pattern table used in a second embodiment of the image forming apparatus according to the present invention.

FIG. 9 is a diagram showing a relationship of the tone and the counted value of the maintenance counter 16 in this second embodiment of the image forming apparatus. In FIG. 9, the ordinate indicates the tone (%), and the abscissa indicates the counted value of the maintenance counter 16. Further, R1 denotes a region in which the tone is obtained by use of the reference tone pattern B which is formed by dots respectively made up of 4×4 pixels, R2 denotes a region in which the tone is obtained by use of the reference tone pattern B which is formed by dots respectively made up of 8×8 pixels, and R3 denotes a region in which the tone is obtained by use of the reference tone pattern B which is formed by dots respectively made up of 10×10 pixels. The relationship shown in FIG. 9 is obtained experimentally.

FIG. 10 is a diagram showing contents of a pattern table used in this second embodiment of the image forming apparatus. This pattern table is stored in the program ROM 6. As the counted value of the maintenance counter 16 becomes larger, it is judged that the degree of deterioration of the printer engine 8 has increased, and that the dots forming the reference tone pattern B has become smaller to affect the actual tone of the image printed on the recording medium. Hence, the size of the dots forming the reference tone pattern B is increased as shown in FIG. 10 as the counted value of the maintenance counter 16 increases from "100" to "2000", for example.

Figure 11:
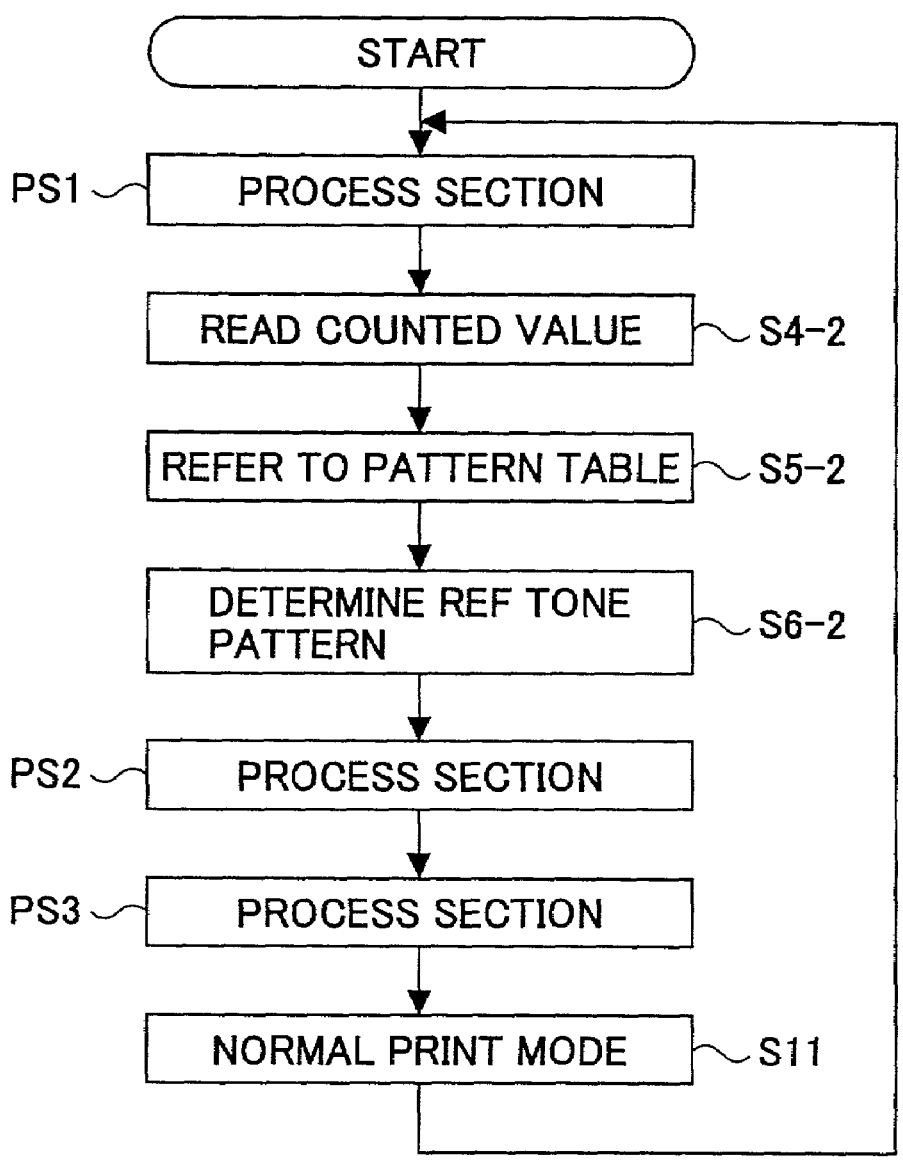
FIG. 11 is a flow chart for explaining the operation of the second embodiment of the image forming apparatus.

FIG. 11 is a flow chart for explaining the operation of this second embodiment of the image forming apparatus. In FIG. 11, those steps which are the same as those corresponding steps in FIG. 8 are designated by the same reference numerals, and a description thereof will be omitted. The process shown in FIG. 11 is carried out by the CPU 4 within the printer controller 2 shown in FIG. 2. The second embodiment of the computer-readable storage medium stores a program for causing a computer, such as the CPU 4, to carry out the process shown in FIG. 11. The second embodiment of the computer-readable storage medium is formed by the program ROM 6 or any type of recording media described above.

In FIG. 11, a step S4-2 reads the counted value of the maintenance counter 16. A step S5-2 refers to the pattern table shown in FIG. 10 which is stored in the program ROM 6. The pattern table stores the size of the dots which are to form the reference tone patterns B in correspondence with the counted value of the maintenance counter 16. Hence, the corresponding dot size of the reference tone pattern B can be read from the pattern table based on the counted value of the maintenance counter 16. A step S6-2 determines the reference tone pattern B based on the dot size read from the pattern table.

Therefore, the dot size of the reference tone pattern B is automatically selected in this second embodiment depending on the counted value of the maintenance counter 16. Further, it is possible to carry out an accurate tone adjusting process even when the output characteristic of the printer engine 8 varies due to aging of the printer, so that the tone intended by the user is actually printed by the printer.

Another amount which may be referred to in order to judge the degree of deterioration of the printer engine 8, is the remaining amount of toner within the printer. The remaining amount of toner detected by the toner sensor 18 may be referred to by the CPU 4 of the printer controller 2 at an arbitrary timing. For example, the toner sensor 18 outputs a value corresponding to a level of the remaining toner within a toner chamber, that is, the remaining amount of toner. The degree of deterioration of the printer engine 8 can be predicted from the output value of the toner sensor 18, and a third embodiment of the image forming apparatus according to the present invention employs such a prediction. In this third embodiment of the image forming apparatus, the present invention is applied to a printer having the structure shown in FIGS. 2 and 3. Further, this third embodiment of the image forming apparatus employs a third embodiment of the printer controller according to the present invention and a third embodiment of the computer-readable storage medium according to the present invention.

Figures 12, 13:
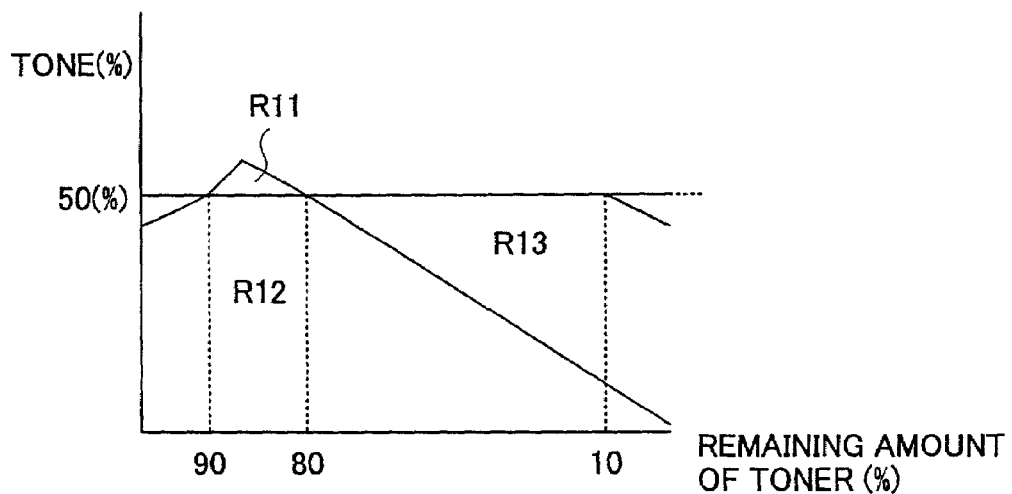
FIG. 12 is a diagram showing a relationship of the tone and a remaining amount of toner.
FIG. 13 is a diagram showing contents of a pattern table used in a third embodiment of the image forming apparatus according to the present invention.

FIG. 12 is a diagram showing a relationship of the tone and the output value of the toner sensor 18 in this third embodiment of the image forming apparatus. In FIG. 12, the ordinate indicates the tone (%), and the abscissa indicates the output value (%) of the toner sensor 18. Further, R11 denotes a region in which the tone is obtained by use of the reference tone pattern B which is formed by dots respectively made up of 4×4 pixels, R12 denotes a region in which the tone is obtained by use of the reference tone pattern B which is formed by dots respectively made up of 3×3 pixels, and R13 denotes a region in which the tone is obtained by use of the reference tone pattern B which is formed by dots respectively made up of 10×10 pixels. The relationship shown in FIG. 12 is obtained experimentally so that various parameters peculiar to each individual printer are reflected to a pattern table shown in FIG. 13 which will be described later, since the tone may increase temporarily as shown in FIG. 12 after the toner is supplied or replaced.

FIG. 13 is a diagram showing contents of the pattern table used in this third embodiment of the image forming apparatus. This pattern table is stored in the program ROM 6. As the output value of the toner sensor 18 becomes smaller, it is judged that the degree of deterioration of the printer engine 8 has increased, and that the dots forming the reference tone pattern B has become smaller to affect the actual tone of the image printed on the recording medium. Hence, the size of the dots forming the reference tone pattern B is increased as shown in FIG. 13 as the output value of the toner sensor 18 decreases from 90% to 10%, for example. However, when the remaining amount of toner is 100%, the dot size of the reference tone pattern B is temporarily set large to 4×4 pixels, because the tone temporarily increases in this particular case as shown in FIG. 12.

Figures 14, 15:
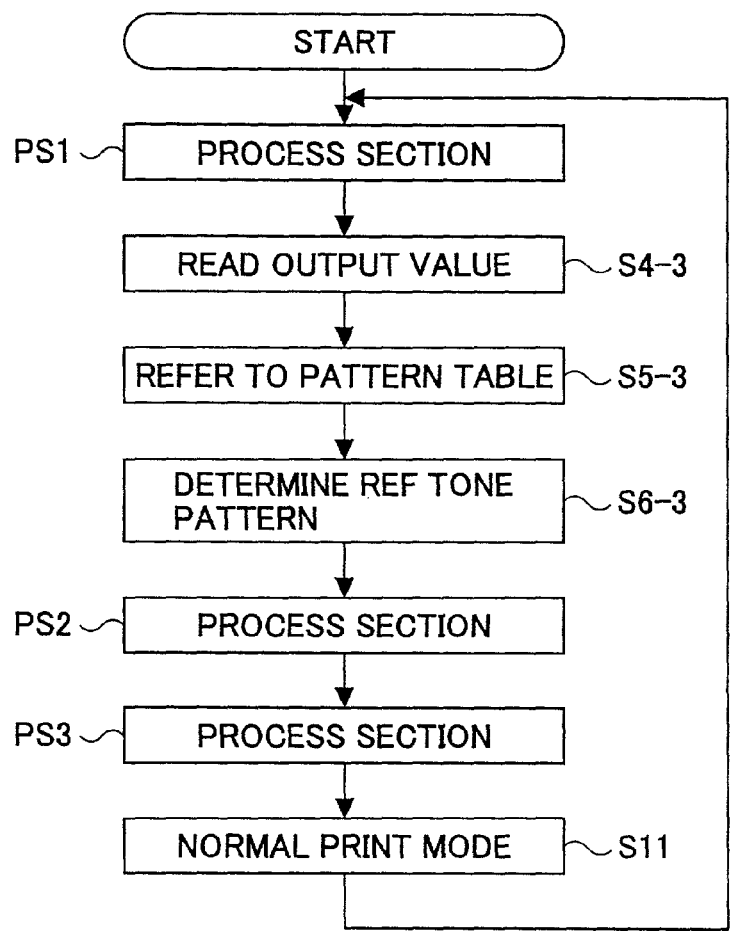
FIG. 14 is a flow chart for explaining the operation of the third embodiment of the image forming apparatus.
FIG. 15 is a diagram showing contents of a pointer table used in a fourth embodiment of the image forming apparatus according to the present invention.

FIG. 14 is a flow chart for explaining the operation of this third embodiment of the image forming apparatus. In FIG. 14, those steps which are the same as those corresponding steps in FIG. 8 are designated by the same reference numerals, and a description thereof will be omitted. The process shown in FIG. 14 is carried out by the CPU 4 within the printer controller 2 shown in FIG. 2. The third embodiment of the computer-readable storage medium stores a program for causing a computer, such as the CPU 4, to carry out the process shown in FIG. 14. The third embodiment of the computer-readable storage medium is formed by the program ROM 6 or any type of recording media described above.

In FIG. 14, a step S4-3 reads the output value of the toner sensor 18. A step S5-3 refers to the pattern table shown in FIG. 13 which is stored in the program ROM 6. The pattern table stores the size of the dots which are to form the reference tone patterns B in correspondence with the output value of the toner sensor 18. Hence, the corresponding dot size of the reference tone pattern B can be read from the pattern table based on the output value of the toner sensor 18. A step S6-3 determines the reference tone pattern B based on the dot size read from the pattern table.

Therefore, the dot size of the reference tone pattern B is automatically selected in this third embodiment depending on the output value of the toner sensor 18. Further, it is possible to carry out an accurate tone adjusting process even when the output characteristic of the printer engine 8 varies due to consumption of the toner within the printer, so that the tone intended by the user is actually printed by the printer.

Still another amount which may be referred to in order to judge the degree of deterioration of the printer engine 8, is the type of printer engine 8 used by the printer. The type of printer engine 8 can be recognized by the CPU 4 by reading the contents of the engine ID register 17. The type of printer engine 8 indicated by the engine ID which is stored in the engine ID register 17 may be referred to by the CPU 4 of the printer controller 2 at an arbitrary timing. The degree of deterioration of the printer engine 8, which varies depending on the type of the printer engine 8, can be predicted from the engine ID stored in the engine ID register 17, and a fourth embodiment of the image forming apparatus according to the present invention employs such a prediction. In this fourth embodiment of the image forming apparatus, the present invention is applied to a printer having the structure shown in FIGS. 2 and 3. Further, this fourth embodiment of the image forming apparatus employs a fourth embodiment of the printer controller according to the present invention and a fourth embodiment of the computer-readable storage medium according to the present invention.

FIG. 15 is a diagram showing contents of the pointer table used in this fourth embodiment of the image forming apparatus. This pointer table is stored in the program ROM 6. The contents of the pattern table shown in FIG. 10 or FIG. 13 differs depending on the type of the printer engine 8 that is used. Hence, in this fourth embodiment, a number of pattern tables, such as that shown in FIG. 10 or FIG. 13, corresponding to the number of types of printer engines 8 usable by the printer controller 2 are prestored in the program ROM 6 for various selectable dot sizes, and the appropriate pattern table is used depending on the recognized type of the printer engine 8 and the selected dot size. Accordingly, a pointer to the corresponding pattern table is stored in the pointer table shown in FIG. 15 with respect to each type, that is, each engine ID of the printer engine 8.

Figure 16:
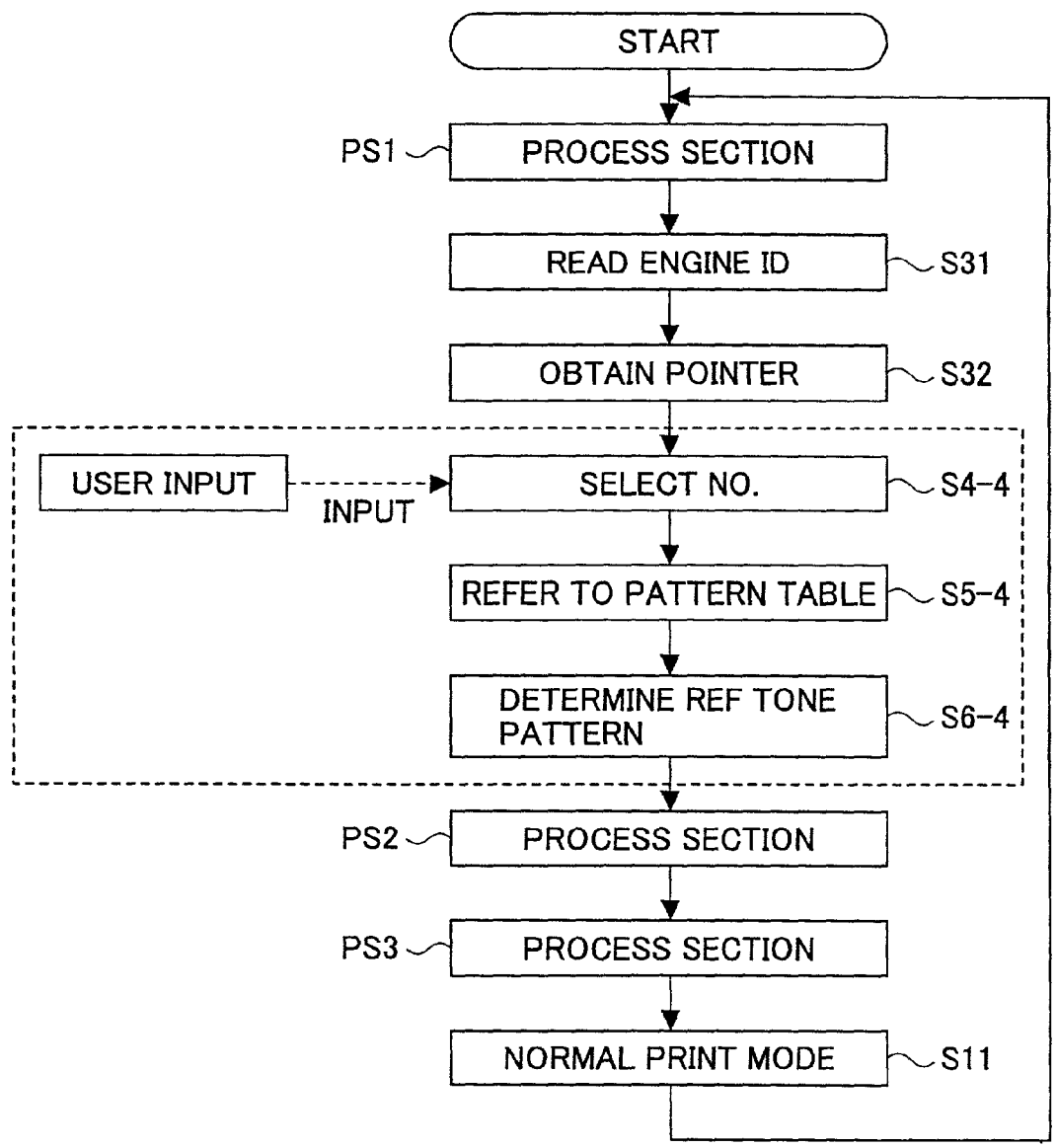
FIG. 16 is a flow chart for explaining the operation of the fourth embodiment of the image forming apparatus.

FIG. 16 is a flow chart for explaining the operation of this fourth embodiment of the image forming apparatus. In FIG. 16, those steps which are the same as those corresponding steps in FIG. 8 are designated by the same reference numerals, and a description thereof will be omitted. The process shown in FIG. 16 is carried out by the CPU 4 within the printer controller 2 shown in FIG. 2. The fourth embodiment of the computer-readable storage medium stores a program for causing a computer, such as the CPU 4, to carry out the process shown in FIG. 16. The fourth embodiment of the computer-readable storage medium is formed by the program ROM 6 or any type of recording media described above.

In FIG. 16, a step S31 reads the engine ID from the engine ID register 17, and a step S32 refers to the pointer table shown in FIG. 15 which is stored in the program ROM 6 to obtain the pointer to the pattern table which is stored in the program ROM 6 and corresponds to the read engine ID. Then, a step S4-4 selects a number or code assigned to the selected size of the dots which are to form the reference tone pattern B, in response to the input made by the user from the operation panel 12. A step S5-4 refers to the pattern table which is stored in the program ROM 6 and indicated by the pointer obtained by the step S32, depending on the dot size selected by the step S4-4. The pattern table indicated by the pointer stores the reference tone patterns B in correspondence with the numbers or codes assigned to the selected dot sizes. Hence, the corresponding reference tone pattern B can be read from the pattern table based on the input number or code assigned to the selected dot size. A step S6-4 determines the reference tone pattern B based on the pattern table.

Of course, if the pattern table shown in FIG. 10 is used by combining the second and fourth embodiments, the step S6-4 automatically determines the dot size of the reference tone pattern B depending on the counted value of the maintenance counter 16. Hence, in this case, the steps S4-4 through S6-4 are replaced by the steps S4-2 through S6-2 shown in FIG. 11. Similarly, if the pattern table shown in FIG. 13 is used by combining the third and fourth embodiments, the step S6-4 automatically determines the dot size of the reference tone pattern B depending on the output value of the toner sensor 18. Thus, in this case, the steps S4-4 through S6-4 are replaced by the steps S4-3 through S4-6 shown in FIG. 14.

Therefore, since this fourth embodiment selects the dot size of the reference tone pattern B depending on the type of the printer engine 8, it is possible to carry out an accurate tone adjusting process even when the type of the printer engine 8 used is changed, so that the tone intended by the user is actually printed by the printer.

Another amount which may be referred to in order to judge the degree of deterioration of the printer engine 8, is the resolution to be used for the printing by the printer. The resolution may be specified by the user from the operation panel 12 at an arbitrary timing. The degree of deterioration of the printer engine 8 can be predicted from the specified resolution, and a fifth embodiment of the image forming apparatus according to the present invention employs such a prediction. In this fifth embodiment of the image forming apparatus, the present invention is applied to a printer having the structure shown in FIGS. 2 and 3. Further, this fifth embodiment of the image forming apparatus employs a fifth embodiment of the printer controller according to the present invention and a fifth embodiment of the computer-readable storage medium according to the present invention.

Figures 17, 18:
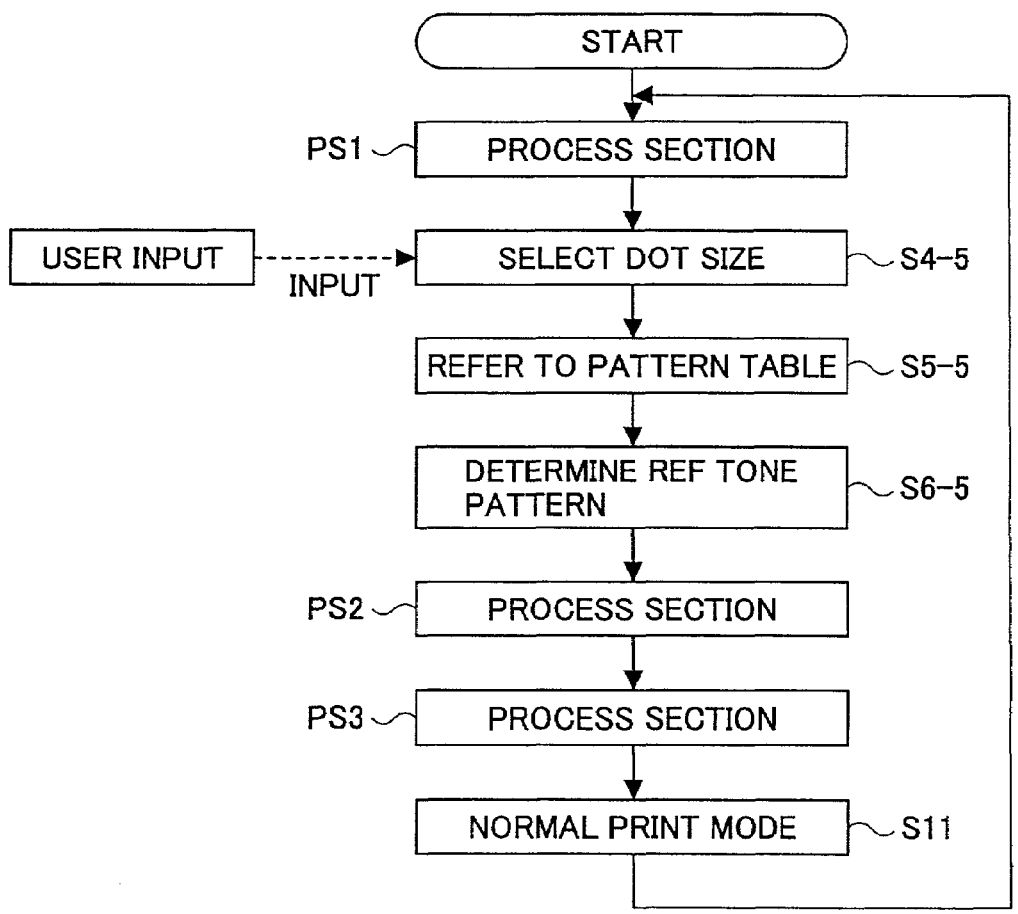
FIG. 17 is a diagram showing contents of a pattern table used in a fifth embodiment of the image forming apparatus according to the present invention.
FIG. 18 is a flow chart for explaining the operation of the fifth embodiment of the image forming apparatus.

FIG. 17 is a diagram showing contents of the pattern table used in this fifth embodiment of the image forming apparatus. This pattern table is stored in the program ROM 6. As the resolution becomes higher, it is judged that the degree of deterioration of the printer engine 8 has increased, and that the dots forming the reference tone pattern B has become smaller to affect the actual tone of the image printed on the recording medium. This is because the reproducibility of the dots becomes poorer as the resolution of the reference tone pattern B becomes higher. Hence, the size of the dots forming the reference tone pattern B is increased as shown in FIG. 17 as the resolution increases from "300×300 dpi" to "1200×1200 dpi", for example.

FIG. 18 is a flow chart for explaining the operation of this fifth embodiment of the image forming apparatus. In FIG. 18, those steps which are the same as those corresponding steps in FIG. 8 are designated by the same reference numerals, and a description thereof will be omitted. The process shown in FIG. 18 is carried out by the CPU 4 within the printer controller 2 shown in FIG. 2. The fifth embodiment of the computer-readable storage medium stores a program for causing a computer, such as the CPU 4, to carry out the process shown in FIG. 18. The fifth embodiment of the computer-readable storage medium is formed by the program ROM 6 or any type of recording media described above.

In FIG. 18, a step S4-5 selects the size of the dots which are to form the reference tone pattern B, in response to the resolution which is input by the user from the operation panel 12. A step S5-5 refers to the pattern table which is stored in the program ROM 6, depending on the resolution input by the step S4-5. The pattern table stores dot sizes of the reference tone patterns B in correspondence with the resolutions. Hence, the corresponding reference tone pattern B can be read from the pattern table based on the selected resolution. A step S6-5 determines the reference tone pattern B based on the pattern table.

Of course, a pattern table such as that shown in FIG. 17 may be stored in the program ROM 6 in correspondence with each type of printer engine 8 usable by the printer controller 2. In this case, it is possible to combine the fourth and fifth embodiments, so that the pattern table corresponding to the selected resolution is selected depending on the type of the printer engine 8 recognized by the engine ID.

Therefore, since this fifth embodiment selects the dot size of the reference tone pattern B depending on the resolution, it is possible to carry out an accurate tone adjusting process even when the resolution used is changed, so that the tone intended by the user is actually printed by the printer.

In the case of a color printer, it is necessary to take into consideration the differences of the tone characteristics of the basic colors, such as cyan, magenta, yellow and black, which are used to form the color image. In order to determine an optimum reference tone pattern for each basic color, it is necessary to prepare at least one of the tables described above in conjunction with the first through fifth embodiments with respect to each basic color.

Figure 19:
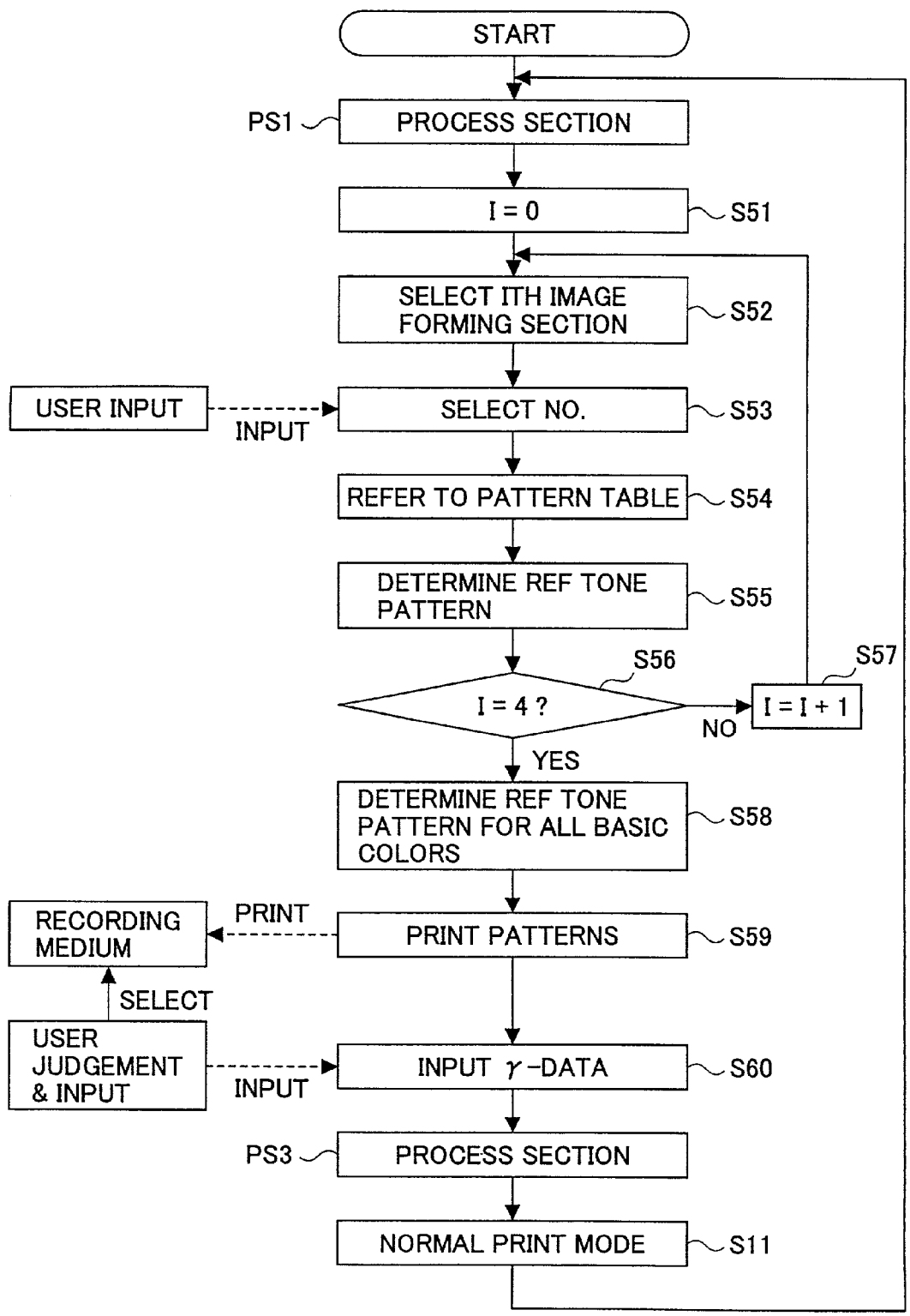
FIG. 19 is a flow chart for explaining the operation of a sixth embodiment of the image forming apparatus according to the present invention.

FIG. 19 is a flow chart for explaining the operation of a sixth embodiment of the image forming apparatus. In this sixth embodiment of the image forming apparatus, the present invention is applied to a color printer. Hence, the printer engine 8 shown in FIG. 2 includes four known image forming sections, for example, for respectively printing in the basic colors of cyan, magenta, yellow and black. In FIG. 19, those steps which are the same as those corresponding steps in FIG. 8 are designated by the same reference numerals, and a description thereof will be omitted. The process shown in FIG. 19 is carried out by the CPU 4 within the printer controller 2 shown in FIG. 2. The sixth embodiment of the computer-readable storage medium stores a program for causing a computer, such as the CPU 4, to carry out the process shown in FIG. 19. The sixth embodiment of the computer-readable storage medium is formed by the program ROM 6 or any type of recording media described above.

In FIG. 19, a step 51 sets I to I=0 after carrying out the process section PS1, where I denotes the number assigned to the image forming sections of the printer engine 8. For example, I=0 for the cyan image forming section, I=1 for the magenta image forming section, I=2 for the yellow image forming section, and I=3 for the black image forming section. A step S52 selects the Ith image forming section of the printer engine 8.

A step S53 selects a number or code assigned to the selected size of the dots which are to form the reference tone pattern B with respect to the basic color used by the Ith image forming section, in response to the input made by the user from the operation panel 12. The user can select the number of code assigned to the selected size of the dots which are to form the reference tone pattern B, depending on the condition under which the printer is to carry out the printing. A step S54 refers to the pattern tables stored in the program ROM 6. The pattern tables store the reference tone patterns B in correspondence with the numbers or codes assigned to the selected dot sizes, with respect to each of the basic colors. Hence, the corresponding reference tone pattern B can be read from the corresponding pattern table based on the input number or code assigned to the selected dot size, with respect to the basic color used by the Ith image forming section. A step S55 determines the reference tone pattern B based on the corresponding pattern table, with respect to the basic color used by the Ith image forming section.

A step S56 decides whether or not I=4. If the decision result in the step S56 is NO, a step S57 increments I to I=I+1, and the process returns to the step S52 so as to carry out a process similar to that described above with respect to the next basic color. On the other hand, if the decision result in the step S56 is YES, a step S58 determines the reference tone pattern B of each of the basic colors.

A step S59 prints on the recording medium the selected reference tone pattern B together with the tone adjusting patterns A(1) through A(8) which are also stored in the program ROM 6, with respect to each of the basic colors, so as to obtain a printed output result similar to that shown in FIG. 5, with respect to each of the basic colors. As a result, four patterns, each corresponding to the pattern shown in FIG. 5 and corresponding to the four basic colors, are printed on the recording medium. The tone adjusting patterns A(1) through A(8) have mutually different tones which fall within the predetermined tone range which includes the reference tone of the selected reference tone pattern B. The user inputs from the operation panel 12 the number (6), for example, which is assigned to the tone adjusting pattern A(6), so as to reflect the tone value of the tone adjusting pattern A(6) to the γ-correction, with respect to one basic color, and makes similar inputs with respect to the remaining basic colors. Hence, a step S60 inputs the γ-data corresponding to the selected tone adjusting pattern A(6) for one basic color and the γ-data corresponding to the selected tone adjusting patterns for the remaining basic colors. Hence, the process section PS3 is carried out with respect to each of the basic colors.

Therefore, according to this sixth embodiment, it is possible to generate the reference tone pattern B which is made up of dots respectively made up of a number of pixels selected depending on the conditions under which the printer is to carry out the printing, with respect to each of the basic colors used by the image forming sections of the printer engine 8. For this reason, the reference tone which is printed on the recording medium can be maintained constant regardless of the various factors such as the conditions of the printer at the time of the printing, the changes caused by aging of the printer, the differences in the performance of each individual printer inevitably introduced during the production process and/or by the components used, the set output condition of the printer engine 8, and the like, with respect to each of the basic colors. Hence, it is possible to carry out an appropriate tone adjusting process by use of the recording medium which is printed with the selected reference tone pattern B and the tone adjusting patterns A(1) through A(8), so that the tone intended by the user is actually printed by the printer, with respect to each of the basic colors.

In other words, since this sixth embodiment selects the dot size of the reference tone pattern B depending on the basic colors which are used to print the color image, it is possible to carry out an accurate tone adjusting process even when the basic colors which are used to print the color image are changed, so that the tone intended by the user is actually printed by the printer.

Of course, the second through fifth embodiments described above may be modified for the color printer, similarly to modifying the first embodiment to the sixth embodiment.

Although the present invention is applied to a printer in the embodiments described above, the present invention is similarly applicable to any type of image forming apparatus, including a copying machine and a facsimile machine. In addition, the printer engine is not limited to the type which carries out the electrophotography process, and may print the image by other image forming processes such as an ink jet process.

Further, the present invention is not limited to these embodiments, but various variations may be made without departing from the scope of the present invention.

This application also claims the benefit of a Japanese Patent Application No. 2001-229311 filed Jul. 30, 2001, in the Japanese Patent Office, the disclosure of which is hereby incorporated by reference.

What is claimed is:

1. A printer controller configured to generate pattern data for use in a tone adjusting process, said printer controller comprising:
   a selecting unit configured to select a dot size of a reference tone pattern by varying a number of pixels forming each dot of the reference tone pattern; and
   a generating unit configured to generate and output to a printer device said reference tone pattern having the dot size selected by said selecting unit and tone adjusting patterns having tones of a predetermined range including a reference tone of said reference tone pattern such that the printer device prints the reference tone pattern and the tone adjusting patterns on a recording medium for evaluation in the tone adjusting process,
   wherein said generating unit is configured to generate said reference tone pattern and the tone adjusting patterns such that said reference tone pattern includes a central portion and reference sector portions arranged intermittently around said central portion, the tone adjusting patterns include adjusting sector portions arranged intermittently around said central portion and each respectively located between two of the reference sector portions, whereby each of the adjusting sector portions has three sides respectively adjacent to said central portion and two reference sector portions.

2. The printer controller as claimed in claim 1, wherein said selecting unit is configured to select the dot size in response to an external input.

3. The printer controller as claimed in claim 1, wherein said selecting unit is configured to select the dot size depending on a counted value of a maintenance counter, said counted value indicating a total operating time of a printer engine.

4. The printer controller as claimed in claim 1, wherein said selecting unit is configured to select the dot size depending on an output value of a toner sensor, said output value indicating a remaining amount of toner within a printer engine.

5. The printer controller as claimed in claim 1, wherein said selecting unit is configured to select the dot size depending on an engine ID stored in a register, said engine ID indicating a type of a printer engine.

6. The printer controller as claimed in claim 1, wherein said selecting unit is configured to select the dot size depending on a resolution input to the printer controller.

7. The printer controller as claimed in claim 1, wherein said selecting unit is configured to select the dot size depending on each of basic colors used by corresponding image forming sections of a printer engine.

8. The printer controller as claimed in claim 1, further comprising:
   a correcting unit configured to determine a γ-correction based on an external input, the external input being based on a printed output of the reference tone pattern and the tone adjusting patterns generated by said generating unit.

9. The printer controller as claimed in claim 1, wherein the generating unit is configured to generate means for determining one of the tone adjusting patterns matching the reference tone pattern.

10. An image forming apparatus comprising:
    a printer controller configured to generate pattern data; and
    a printer engine configured to print the pattern data generated by said printer controller,
    said printer controller comprising:
        a selecting unit configured to select a dot size of a reference tone pattern by varying a number of pixels forming each dot of the reference tone pattern; and
        a generating unit configured to generate and output a reference tone pattern having the dot size selected by said selecting unit and tone adjusting patterns having tones of a predetermined range including a reference tone of said reference tone pattern,
    wherein the printer engine is configured to print the reference tone pattern and the tone adjusting patterns on a recording medium for evaluation in a tone adjusting process,
    wherein said generating unit of said printer controller is configured to generate said reference tone pattern and the tone adjusting patterns such that said reference tone pattern includes a central portion and reference sector portions arranged intermittently around said central portion, the tone adjusting patterns include adjusting sector portions arranged intermittently around said central portion and each respectively located between two of the reference sector portions, whereby each of the adjusting sector portions has three sides respectively adjacent to said central portion and two reference sector portions.

11. The image forming apparatus as claimed in claim 10, wherein said selecting unit is configured to select the dot size in response to an external input.

12. The image forming apparatus as claimed in claim 10, wherein said printer engine includes a maintenance counter configured to determine a counted value indicating a total operating time of the printer engine, and said selecting unit of said printer controller is configured to select the dot size depending on the counted value of the maintenance counter.

13. The image forming apparatus as claimed in claim 10, wherein said printer engine includes a toner sensor configured to generate an output value indicating a remaining amount of toner within said printer engine, and said selecting unit of said printer controller is configured to select the dot size depending on the output value of the toner sensor.

14. The image forming apparatus as claimed in claim 10, wherein said printer engine includes a register configured to store an engine ID indicating a type of said printer engine, and said selecting unit of said printer controller is configured to select the dot size depending on the engine ID stored in the register.

15. The image forming apparatus as claimed in claim 10, wherein said selecting unit of said printer controller is configured to select the dot size depending on a resolution input to the printer controller.

16. The image forming apparatus as claimed in claim 10, wherein said printer engine includes image forming sections respectively corresponding to basic colors used to print a color image, and said selecting unit of said printer controller is configured to select the dot size depending on each of the basic colors.

17. The image forming apparatus as claimed in claim 10, wherein said printer controller further includes a correcting unit configured to determine a γ-correction based on an external input, the external input being based on a printed output of the reference tone pattern and the tone adjusting patterns generated by said generating unit.

18. The printer controller as claimed in claim 10, wherein the generating unit is configured to generate means for determining one of the tone adjusting patterns matching the reference tone pattern.

19. A tangible computer-readable storage medium configured to store computer code configured to cause a computer to generate pattern data, to be printed by a printer engine, for use in a tone adjusting process, said computer code comprising:
first computer code configured to cause the computer to select a dot size of a reference tone pattern by varying a number of pixels forming each dot of the reference tone pattern; and
second computer code configured to cause the computer to generate and output, to the printer engine, said reference tone pattern having the dot size selected by said selecting unit and tone adjusting patterns having tones of a predetermined range including a reference tone of said reference tone pattern,
wherein the printer engine is configured to print the reference tone pattern and the tone adjusting patterns on a recording medium for evaluation in the tone adjusting process,
wherein said second computer code causes the computer to generate said reference tone pattern and the tone adjusting patterns such that said reference tone pattern includes a central portion and reference sector portions arranged intermittently around said central portion, the tone adjusting patterns include adjusting sector portions arranged intermittently around said central portion and each respectively located between two of the reference sector portions, whereby each of the adjusting sector portions has three sides respectively adjacent to the central portion and two sector reference portions.

20. The tangible computer-readable storage medium as claimed in claim 19, wherein said first computer code causes the computer to select the dot size in response to an external input.

21. The tangible computer-readable storage medium as claimed in claim 19, wherein said first computer code causes the computer to select the dot size depending on a counted value of a maintenance counter, said counted value indicating a total operating time of the printer engine.

22. The tangible computer-readable storage medium as claimed in claim 19, wherein said first computer code causes the computer to select the dot size depending on an output value of a toner sensor, said output value indicating a remaining amount of toner within the printer engine.

23. The tangible computer-readable storage medium as claimed in claim 19, wherein said first computer code causes the computer to select the dot size depending on an engine ID indicating a type of the printer engine.

24. The tangible computer-readable storage medium as claimed in claim 19, wherein said first computer code causes the computer to select the dot size depending on a resolution input to the printer controller.

25. The tangible computer-readable storage medium as claimed in claim 19, wherein said first computer code causes the computer to select the dot size depending on each of basic colors used by corresponding image forming sections of the printer engine.

26. The tangible computer-readable storage medium as claimed in claim 19, wherein said program further comprises:
third computer code configured to cause the computer to determine a γ-correction based on an external input, the external input being based on a printed output of the reference tone pattern and the tone adjusting patterns.

27. The computer-readable storage medium as claimed in claim 19, wherein the second computer code causes the computer to generate means for determining one of the tone adjusting patterns matching the reference tone pattern.

28. A printer controller configured to generate pattern data, printed by a printer engine, for use in a tone adjusting process, said printer controller comprising:
means for selecting a dot size of a reference tone pattern by varying a number of pixels forming each dot of the reference tone pattern; and
means for generating and outputting, to the printer engine, said reference tone pattern having the dot size selected by said selecting means and tone adjusting patterns having tones of a predetermined range including a reference tone of said reference tone pattern, wherein the printer engine is configured to print the reference tone pattern and the tone adjusting patterns on a recording medium for evaluation in the tone adjusting process, wherein said means for generating generates said reference tone pattern and the tone adjusting patterns such that said reference tone pattern includes a central portion and reference sector portions arranged intermittently around said central portion, the tone adjusting patterns include adjusting sector portions arranged intermittently around said central portion and each respectively located between two of the reference sector portions, whereby each of the adjusting sector portions has three sides respectively adjacent to said central portion and two reference sector portions.

29. The printer controller as claimed in claim 28, wherein the means for generating and outputting is configured to generate and output means for determining one of the tone adjusting patterns matching the reference tone pattern.

30. A method of adjusting a tone pattern printed by a printer engine, said method comprising:

selecting a dot size of a reference tone pattern by varying a number of pixels forming each dot of the reference tone pattern;

generating and outputting, to the printer engine, said reference tone pattern having the selected dot size and tone adjusting patterns having tones of a predetermined range including a reference tone of said reference tone pattern;

printing with the printer engine the reference tone pattern and the tone adjusting patterns on a recording medium such that the reference tone pattern includes a central portion and reference sector portions arranged intermittently around said central portion, the tone adjusting patterns include adjusting sector portions arranged around said central portion and each adjusting sector pattern is located between two reference sector portions, and each of the adjusting sector portions has three sides respectively adjacent to the central portion and two reference sector portions; and adjusting the tone pattern printed by the printer engine based on a comparison of the reference tone pattern and the tone adjusting patterns printed on the recording medium.

31. The method of adjusting a tone pattern as claimed in claim 30, wherein said generating and outputting includes generating and outputting means for determining one of the tone adjusting patterns matching the reference tone pattern.

32. A method of adjusting a tone pattern printed by a printer engine, said method comprising:

a step for selecting a dot size of a reference tone pattern by varying a number of pixels forming each dot of the reference tone pattern;

a step for generating and outputting, to the printer engine, said reference tone pattern having the selected dot size and tone adjusting patterns having tones of a predetermined range including a reference tone of said reference tone pattern;

a step for printing with the printer engine the reference tone pattern and the tone adjusting patterns on a recording medium such that the reference tone pattern includes a central portion and reference sector portions arranged intermittently around said central portion, the tone adjusting patterns include adjusting sector portions arranged around said central portion and each adjusting sector portion is located between two reference sector portions, and each of the adjusting sector portions has three sides respectively adjacent to the central portion and two reference sector portions; and a step for adjusting the tone pattern printed by the printer engine based on a comparison of the reference tone pattern and the tone adjusting patterns printed on the recording medium.

33. The method of adjusting a tone pattern as claimed in claim 32, said method further comprising:

a step for determining one of the tone adjusting patterns matching the reference tone pattern.

* * * * *